Nov. 14, 1939.    C. D. PETERSON    2,180,019
CHANGE-SPEED TRANSMISSION GEARING
Filed Dec. 18, 1935    3 Sheets-Sheet 1
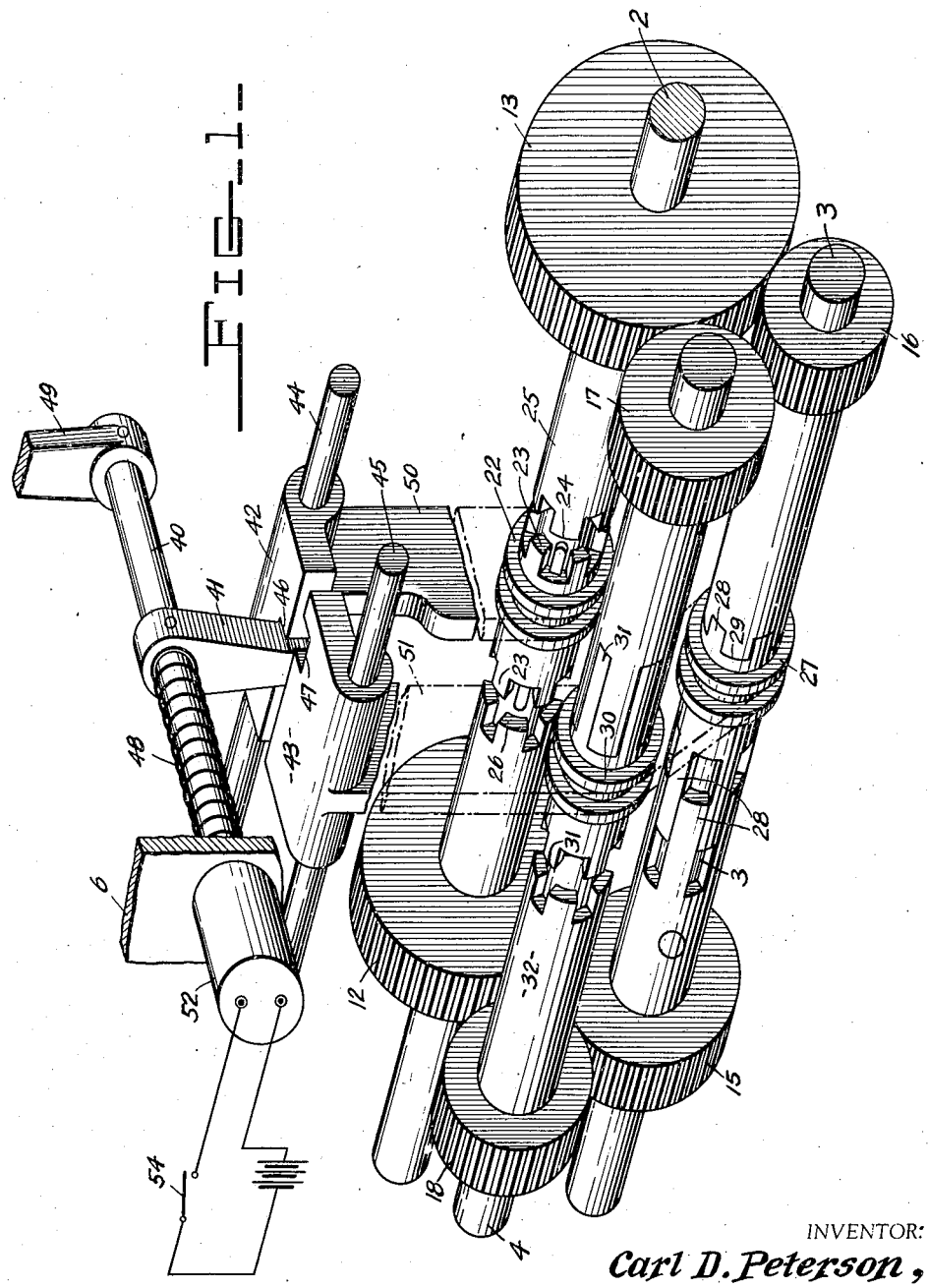
INVENTOR:
Carl D. Peterson,
BY
Bodell & Thompson
ATTORNEYS.

Nov. 14, 1939.  C. D. PETERSON  2,180,019
CHANGE-SPEED TRANSMISSION GEARING
Filed Dec. 18, 1935    3 Sheets-Sheet 2
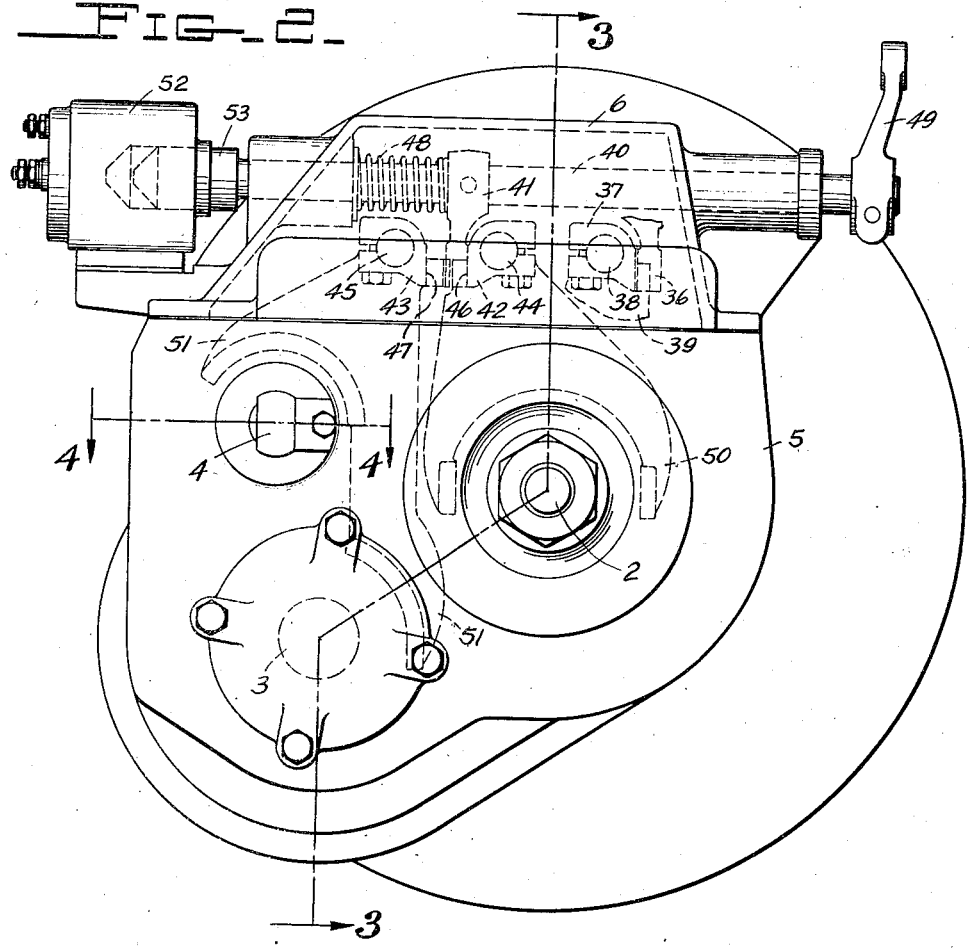
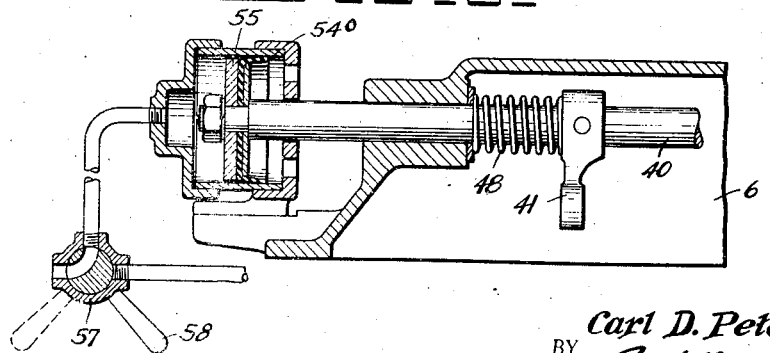
INVENTOR:
Carl D. Peterson,
BY Bodell & Thompson
ATTORNEYS.

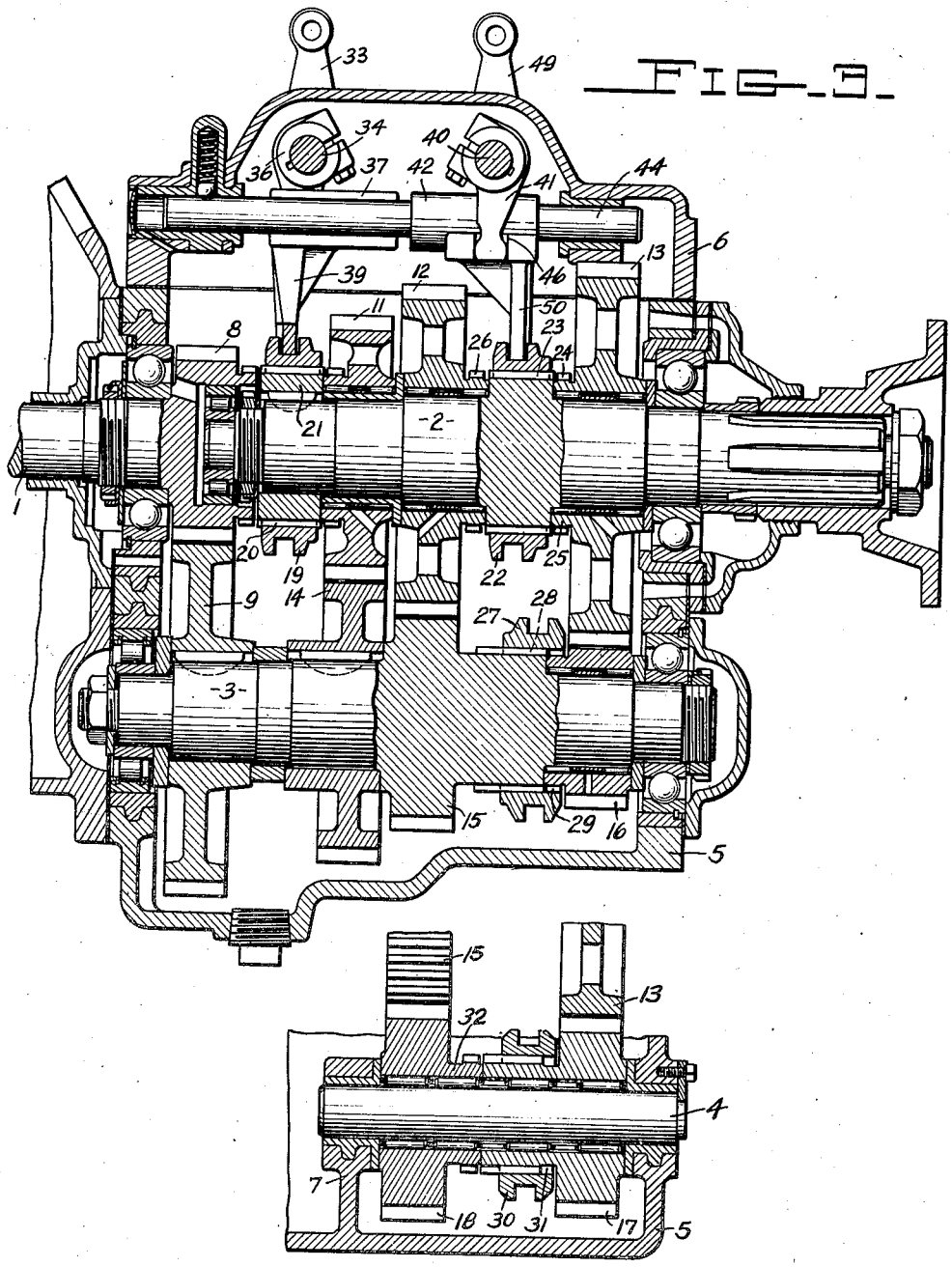

Patented Nov. 14, 1939

2,180,019

UNITED STATES PATENT OFFICE 2,180,019

CHANGE-SPEED TRANSMISSION GEARING

Carl D. Peterson, Toledo, Ohio, assignor to Spicer Manufacturing Corporation, Toledo, Ohio, a corporation of Virginia Application December 18, 1935, Serial No. 55,057

8 Claims. (Cl. 74—359)

This invention relates to selective change-speed transmission gearing of the type used in motor vehicles and has for its object a gear shifting arrangement for one of the speed changes, as reverse speed, which results in a transmission of minimum length compared with transmissions heretofore used of equal capacity, as for instance, an arrangement of the reverse speed in a four speed forward transmission gearing.

It further has for its object a transmission gearing, wherein one of the speeds, as reverse speed, is controlled through a shiftable element primarily for effecting one of the forward speeds, when said element is shifted out of idle or neutral position, together with mechanism which renders the forward speed gear train controlled by that shiftable element ineffective when the reverse speed element is shifted in conjunction therewith.

It further has for its object a shifting mechanism wherein one speed, as the reverse speed, is controlled by one of the shiftable elements being shifted into its position assumed when producing another speed, as forward speed, together with a shifting lever having means for normally holding it in its position assumed when operative to produce the forward speed, together with power mechanism operable to shift it out of its normal position, into position, where it is operable to produce reverse speed.

It further has for its object a particularly simple and efficient mechanism for effecting these operations of the shifting mechanism.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a purely schematic view illustrating the subject matter of this invention, without regard to the specific mechanical construction of the gears, shiftable elements, clutches, etc., these being merely shown conventionally for the purpose of giving illustration of the general arrangement and operation of the gearing.

Figure 2 is an end elevation of the gearing showing the relative arrangement of the parts thereof.

Figure 3 is a sectional view on line 3—3, Figure 2.

Figure 4 is a fragmentary detail view of the reverse gearing.

Figure 5 is a fragmentary view illustrating a modification of the power shifting mechanism.

The gearing is of the all-in-mesh helical gear type and therefore the shiftable elements for controlling the different speeds are clutches.

The transmission gearing here shown comprises a drive shaft 1, transmission shaft 2, countershaft 3, and a reverse gear shaft 4, gearing between the shafts, including shiftable elements, as clutches, and shifting mechanism operable to select and shift the shiftable elements or clutches, one of the shiftable elements, as one of those for producing forward speed, being shiftable from idle or neutral position into its position assumed, when normally producing the forward speed, another of the shiftable elements being shiftable in conjunction therewith but successively thereto for producing another speed, as reverse speed, the shifting of the latter shiftable element cutting out the forward speed gearing controlled by the first shiftable element when shifted into operative position.

The invention further includes a selecting and gear shifting mechanism having means, as a spring, normally urging or holding it in operative relation to the first shiftable element or clutch, so that it must be shifted against the spring to select the reverse speed shifter.

The shifting mechanism also includes means or an arrangement, whereby the selecting mechanism can be shifted to select the reverse speed element only when the forward speed element is shifted to its operative position, and further so that it can not be moved to again select the forward speed element, while the reverse speed element is in its position assumed when establishing reverse speed.

The shafts 1, 2, 3 and 4 are suitably mounted in a gear box 5 having a removable cover 6 in which the selecting and shifting mechanism is mounted, and the driving and transmission shafts 1 and 2 are mounted in the usual manner in axial alinement in bearings mounted in the front and rear walls of the gear box. The countershaft 3 is also mounted in bearings in the front and rear walls of the gear box, while the reverse gear shaft 4, as seen in Figure 4, is mounted at one end in the rear wall of the gear box and at its other end in the bracket 7 in the gear box.

The drive shaft 1 has a gear 8 thereon meshing with a gear 9 keyed to the countershaft 3. The transmission shaft has gears 11, 12 and 13 mounted thereon to rotate about the same and meshing respectively with gears 14, 15 and 16 on the countershaft. The reverse shaft 4 has gears 17 and 18 mounted thereon and meshing respectively with the gear 13 on the transmission shaft and with the gear 15 on the countershaft. The gears 11, 12 and 13 on the transmission shaft are mounted on suitable antifriction bearings and are normally rotatable about or relatively to the transmission shaft. They are connected thereto through shiftable elements or clutches to be presently described. Likewise, the gear 16 on the countershaft is rotatable about the countershaft and is mounted thereon through suitable antifriction bearings and is connectable thereto through shiftable elements to be presently described. Both the gears 17, 18 on the reverse gear shaft are mounted on the shaft through suitable antifriction bearings. These gears are connectable together through a shiftable element, the shiftable element being operable by the selecting and shifting mechanism. The gear 13 on the transmission shaft meshes with two gears 16, 17 forming part of one forward drive and a reverse drive. The gears 16, 17 are alternately connectable in a drive relation through the shiftable elements to produce a forward speed or a reverse speed, and in either case, the gear 13 common to both of them is clutched to the transmission shaft to deliver power thereto in a forward or reverse direction.

19 is a shiftable element slidably connected, as through clutch teeth or splines 20, to a collar 21 on the transmission shaft, this being shiftable rearwardly or to the right (Figure 3) from neutral position to clutch the gear 11 to the transmission shaft, so that an indirect drive is established from the drive shaft 1 through gears 8, 9, 14 and 11. The element 19 is shiftable forwardly or to the left from neutral to clutch the drive shaft 1, transmission shaft 2 directly together in direct drive relation. These two changes produce third and fourth speeds. This shaftable element forms no part of the invention. It is shifted as will be hereinafter described.

22 designates a shiftable element or clutch, which is slidably keyed to the transmission shaft 2 and shifted rearwardly or to the right (Figures 1 and 3) from idle or neutral position to bring its teeth 23 into interlocking engagement with teeth 24 on the hub 25 of the gear 13 common to the forward and reverse drives to produce first speed forward from the drive shaft through gears 8, 9, countershaft 3 and gears 16 and 13, the gear 16 being then clutched to the countershaft to be presently described. The shiftable element 22 is shiftable forwardly or to the left (Figure 3) to interlock its teeth 23 with clutch teeth 26 on the gear 12, and thus lock the gear 12 to the transmission shaft 2 to produce second speed forward from the drive shaft through gears 8, 9, countershaft 3 and gears 15 and 12.

27 is a shiftable element or clutch slidably keyed to the countershaft 3 and normally arranged with its teeth 28 interlocked with teeth on the hub 29 of the gear 16 and shiftable forwardly or to the left (Figure 3) to shift its teeth out of interlocking engagement with the teeth of the hub 29, so that the gear 16 is then free to idle.

30 designates another shifter or clutch shiftable to produce reverse speed. This is mounted on the reverse gear shaft 4 and rotatable with the gear 17 and is normally or during forward drives, in the position shown in the schematic view, Figure 1, and in Figure 4 wherein the drive gear 18 on the reverse shaft 4 is unclutched from the gear 17. It is shiftable forwardly to the left to engage its teeth 31 with the teeth on the hub 32 of the gear 18 to key said gear 18 to the gear 17. The shifting mechanism is so arranged that this shifting operation of the element or clutch 30 can be effected only when the shiftable element or clutch 22 is shifted from neutral rearwardly to clutch the gear 13 to the transmission shaft, and the shifting mechanism is so interconnected that the reverse shiftable element or clutch 30 is shifted into operative position at the same time that the element or clutch 27 is shifted out of operative position, to disconnect the gear 16 from the countershaft and hence, so that the gear 13 on the transmission shaft is never subject to two different drives through the gears 16 and 17.

The gear shifting mechanism is of the selective type including a finger having an axial selecting movement and a fore and aft shifting movement, the finger being mounted on an arm or rock shaft, which rock shaft is shiftable axially and also has a rocking movement.

In the illustrated embodiment of my invention, the high speed shiftable element or clutch 19 is shifted by its own shift lever 33 mounted on a rock shaft 34 which in turn is mounted in the cover 6, this having a rock arm 36 coacting with a block or slide 37 on a shift rod 38, which block has a fork 39 coacting with the groove in the shifter or clutch 19.

The selecting and shifting mechanism for the shiftable elements or clutches 22, 30 and 27 comprises a rock shaft 40 journalled in the cover 6 and having an arm or finger 41 thereon, shifters or blocks 42 and 43 mounted on shift rods 44 and 45 suitably mounted in the cover 6 and connected through forks respectively to the shiftable elements or clutches 22, 27 and 30. The finger 41 is normally arranged in a notch 46 in the shifter or block 42 and is shiftable to establish reverse speed drive into the notch 47 in the shifter or block 43. The rock shaft 40 is shiftable axially to have a selecting movement against a yielding resistance or return spring 48 and has a rocking movement to shift the selected shifters or blocks 42, 43. The shifter block 42 is connected to the clutch 22 through a suitable fork 50 and the reverse shifter block 43 is connected through a suitable fork 51 with the shiftable elements or clutches 30 and 27, so that these latter two clutches are shifted in unison.

In the schematic view (Figure 1) the parts are in their starting, idle or neutral positions. It will be seen that the notch 46 is out of alinement with the notch 47 so that the reverse shifter or block 43 can not be selected and the spring 48 urges the rock shaft 40 to the right or into the notch 46 of the first speed forward shifter block 42. To produce first speed forward, a hand lever 49 on the rock shaft 40 is moved forwardly, thus causing the finger 41 to move rearwardly carrying the first speed shifter or block 42 rearwardly and shifting the clutch or element 22 to carry its teeth into interlocking engagement with the teeth of the gear 13, thus locking the gear 13 to the transmission shaft, so that the transmission shaft is actuated from the drive shaft 1 through the gears 8, 9, 16 and 13. At this time the clutch 27 on the countershaft is in its normal position in which the gear 16 is clutched thereby to the countershaft.

Shifting of the first speed shifter block 42 to its operative position to produce first speed forward brings its notch 46 into alinement with the notch 47 of the reverse shifter block 43. To produce a reverse speed, the shaft 40 of the selecting and shifting mechanism is shifted axially against the spring 48 carrying the finger 41 into notch 47 and out of notch 46. Now upon rearward movement of the hand lever 49, the finger 41 is rocked forwardly, carrying the reverse shifting block 43 forward, and thus leaving the clutch 22 in its operative position in which the gear 13 is clutched to the transmission shaft and shifting the clutch 30 forwardly to engage its teeth 31 with the teeth of the hub 32 of the gear 18 on the reverse gear shaft 4, so that the reverse gear 17 on the shaft 4 rotates with the gear 18. At the same time that the clutch 30 is shifted by reverse speed block 43, the clutch 27 on the countershaft is operated forwardly to carry its teeth out of engagement with the teeth of the hub 29 of the gear 16 on the countershaft, which gear meshes with the common gear 13, so that now reverse speed is established from the drive shaft 1, through gears 8, 9, countershaft 3, gear 15 thereon and gears 18 and 17 on the reverse shaft 4 and gear 13 on the transmission shaft.

Preferably, the rock shaft 40 of the selecting and shifting mechanism is shifted axially by power means to select the reverse shifter block 43 against the reaction of the spring 48. This may be an electro-magnet, as a solenoid 52 having an armature or core 53 mounted on one end of the shaft 40, the windings of the solenoid being connected in a suitable electric circuit having a control switch 54 therein. When shifting to produce reverse, this switch is closed, which causes the solenoid to be energized and tends to pull the rock shaft 40 against the action of the spring 48. However, such shifting of the rock shaft is prevented until the rock shaft is rocked to shift the first and second speed forward block 42 to carry the clutch or shiftable element 22 into its operative position clutching the gear 13 to the transmission shaft, and thus bringing its notch 46 into alinement with the notch 47 of the reverse shifter or block 43. When the notch 46 does come into alinement with the notch 47, the solenoid shifts the finger 41 into the notch 47, whereupon the shaft 40 can be rocked rearwardly by the hand lever 49, thus moving the finger 41 forwardly, shifting the clutches 30 and 27. During this shifting of the shifter 43, the notch 47 is moved out of alinement with the notch 46. The switch 54 can be again opened, as the rock shaft 40 is held from movement under the reaction of the spring 48 by the fact that the notches 46 and 47 are out of alinement. To shift from reverse speed, the hand lever 49 is pushed forwardly, rocking the shaft 40, causing the finger 41 to move rearwardly, shifting the clutches 30 and 27 back to their normal position and bringing the notch 47 of the reverse shifter 43 into alinement with the notch 46 of the first speed forward shifter 42. Now, as the solenoid 52 is de-energized, the spring 48 reacts and immediately carries the finger 41 into the notch 46 of the first speed forward shifter block 42, from which position, it can be shifted back to neutral and into the second speed forward. Obviously, if the switch 54 remains closed, and the solenoid 52 remains energized, alternate rocking of the shaft 40 by the lever 49 in opposite directions will alternately engage reverse and first speed forward.

There is a suitable interlock, not shown, between the levers 33 and 49 or between the rock shafts 34 and 40, so that either can only be operated, when the other is in neutral position.

Instead of the solenoid, any suitable power means may be used, and as shown in Figure 5, a cylinder and piston is used to actuate the rock shaft 40 against the reaction of the spring 48.

540 designates a stationary cylinder having a piston 55 working therein, which piston is mounted on one end of the rock shaft 40. The cylinder is connected through pipes or passages to a suitable source of power, as for instance, the vacuum created in the intake manifold of the engine, the pipes or passages having a two-way valve 57 therein operable by a suitable handle 58. This valve is normally arranged to connect the cylinder to the outer air. When desired to shift the rock shaft 40 axially into reverse speed gear position, the valve 57 is actuated to connect the cylinder to a suitable source of vacuum whereupon the piston 55 is moved to the left (Figure 5) shifting the rock shaft 40 in the same manner as heretofore described in connection with the solenoid 52. Shifting of the two-way valve 57 back to its normal position connects the vacuum cylinder to the outer air, and leaves the rock shaft 40 free to react under the spring 48 when the notch 47 comes into alinement with the notch 46.

It will be understood that during gear shifts the main engine shaft, not shown, is thrown out in the usual manner.

What I claim is:

1. In a selective change-speed transmission gearing, a plurality of shiftable elements for controlling different speeds, shifters for operating said elements respectively, shifting mechanism comprising, in addition to said shifters, a selecting and shifting finger having an axial selecting and a fore and aft shifting movements to select and shift the shiftable shifters, one of said shifters being normally in an operative position and the selecting finger being normally arranged in selective engagement with the other shifter, means for yieldingly resisting the axial shifting of the selecting finger out of engagement with said other shifter, the one shifter having means for blocking the axial selecting movement of the finger when the other shifter is out of operative position, and power means which, when operated, acts on said finger to shift it axially against the yielding resisting means.

2. In a selective change-speed transmission gearing, a plurality of shiftable elements for controlling different gear speeds, shifters for shifting said elements respectively, shifting mechanism comprising, in addition to said shifters, a selecting and shifting finger having an axial selecting and fore and aft shifting movements, the shifter for one of the shiftable elements being normally in operative position and said shifters having notches normally arranged out of alinement, the notch of the shifter for the other shiftable element being movable into alinement with the notch of the one shifter, when the former is shifted to carry its shiftable element into operative position, and the notch of the shifter for the other shiftable element being movable out of alinement with the notch of the shifter for the other shiftable element when the shifter for the other shiftable element is shifted to operative position, the shifter for the other element remaining in operative position.

3. In a selecting change-speed transmission gearing, a plurality of shiftable elements for controlling different gear speeds, shifters for shifting said elements respectively, shifting mechanism comprising, in addition to said shifters, a selecting and shifting finger having an axial selecting and fore and aft shifting movements, the shifter for one of said shiftable elements being normally in operative position and said shifters having notches normally arranged out of alinement, the notch of the shifter for the other shiftable element being movable into alinement with the notch of the one shifter, when the former is shifted to carry its shiftable element into operative position, and the notch of the shifter for the one shiftable element being movable out of alinement with the notch of the shifter for the other shiftable element when the shifter for the first shiftable element is shifted to operative position, the shifter for the second element remaining in operative position, the finger being normally arranged in the notch of the shifter for the other element, means for restraining shifting of the finger out of the notch of the shifter for the other element, and power means operable to shift the shifter axially against the action of the restraining means.

4. In a selective change-speed transmission gearing, a plurality of shiftable elements for controlling different speeds, shifting mechanism comprising shifters connected to said elements, a selecting and shifting finger having axial selecting and a fore and aft shifting movements to select and shift the shiftable shifters, one of said shifters being normally in an operative position and the selecting finger being normally arranged in selective engagement with the other shifter, means for yieldingly resisting the axial shifting of the selecting finger out of engagement with said other shifter, the one shifter having means for blocking the axial selecting movement of the finger, when the other shifter is out of operative position, and power means which, when operated, acts on said finger to shift it axially against the yielding resisting means into shifting engagement with the one shifter, said one shifter being then shiftable out of operative position with the other shifter remaining in operative position, and the other shifter having blocking means for blocking the axial selecting movement of the finger when the one shifter is out of operative position.

5. A selective change-speed transmission gearing including drive and transmission shafts, a countershaft, and a reverse shaft, trains of gearing between the drive and transmission shafts including a gear on the transmission shaft and gears on the countershaft and reverse shaft in mesh with said gear on the transmission shaft, a shiftable element on the transmission shaft movable in opposite directions to connect said gear on the transmission shaft to the transmission shaft and to disconnect it therefrom, other shiftable elements on the countershaft and on the reverse shaft movable in unison and in opposite directions to alternately establish an indirect drive connection of the countershaft gear and the reverse shaft gear with the drive shaft, and mechanism for selecting and shifting the shiftable elements including means for preventing selecting and shifting of said other shiftable elements when the first shiftable element is in the position disconnecting the transmission shaft gear from the transmission shaft and for preventing selecting and shifting of the first shiftable element when said other shiftable elements are shifted to disconnect the indirect drive connection between the countershaft gear and the drive shaft.

6. A selective change-speed transmission gearing including drive and transmission shafts, a countershaft and a reverse shaft, trains of gearing between the drive and transmission shafts including a low speed gear and a second speed forward gear on the transmission shaft and gears on the countershaft and reverse shaft in mesh with the low speed gear on the transmission shaft, a shiftable element on the transmission shaft movable in opposite directions to alternately connect the low speed gear and the second speed gear with the transmission shaft, other shiftable elements on the countershaft and on the reverse shaft movable in unison in opposite directions to alternately establish an indirect drive connection of the countershaft gear and the reverse shaft gear with the drive shaft, and mechanism for selecting and shifting the shiftable elements including means for preventing selecting and shifting of said other shiftable elements when the first shiftable element is in the position disconnecting the low speed gear from the transmission shaft and for preventing selecting and shifting of the first shiftable element when said other shiftable elements are shifted to disconnect the indirect drive connection between the countershaft gear and the drive shaft.

7. A selective change-speed transmission gearing including drive and transmission shafts, a countershaft, and a reverse shaft, trains of gearing between the drive and transmission shafts including a gear on the transmission shaft and gears on the countershaft and reverse shaft in mesh with said gear on the transmission shaft, a shiftable element on the transmission shaft movable in opposite directions to connect said gear on the transmission shaft to the transmission shaft and to disconnect it therefrom, other shiftable elements on the countershaft and on the reverse shaft movable in unison and in opposite directions to alternately establish an indirect drive connection of the countershaft gear and the reverse shaft gear with the drive shaft, and mechanism for selecting and shifting the shiftable elements including a finger having an axial selecting and fore and aft shifting movement, a shifter for the first shiftable element and a shifter for said other shiftable elements, the shifters having notches for receiving the finger, the notches being in alinement to permit axial movement of the finger only when the transmission shaft gear is connected to the transmission shaft and the drive connection is established between the countershaft gear and the drive shaft.

8. A selective change-speed transmission gearing including drive and transmission shafts, a countershaft and a reverse shaft, trains of gearing between the drive and transmission shafts including a low speed gear and a second speed forward gear on the transmission shaft and gears on the countershaft and reverse shaft in mesh with the low speed gear on the transmission shaft, a shiftable element on the transmission shaft movable in opposite directions to alternately connect the low speed gear and the second speed gear with the transmission shaft, other shiftable elements on the countershaft and on the reverse shaft movable in unison in opposite directions to alternately establish an indirect drive connection of the countershaft gear and the reverse shaft gear with the drive shaft, and mechanism for selecting and shifting the shiftable elements including a finger having an axial selecting and a fore and aft shifting movement, a shifter for the first shiftable element and a shifter for said other shiftable elements, the shifters having notches for receiving the finger, the notches being in alinement to permit axial movement of the finger only when the low speed gear is connected to the transmission shaft and the drive connection is established between the countershaft gear and the drive shaft.

CARL D. PETERSON.